(12) United States Patent
Liu et al.

(10) Patent No.: US 12,254,692 B2
(45) Date of Patent: Mar. 18, 2025

(54) CONSTRUCTION METHOD AND SYSTEM OF DESCRIPTIVE MODEL OF CLASSROOM TEACHING BEHAVIOR EVENTS

(71) Applicant: CENTRAL CHINA NORMAL UNIVERSITY, Hubei (CN)

(72) Inventors: Sannyuya Liu, Hubei (CN); Zengzhao Chen, Hubei (CN); Zhicheng Dai, Hubei (CN); Shengming Wang, Hubei (CN); Xiuling He, Hubei (CN); Baolin Yi, Hubei (CN)

(73) Assignee: CENTRAL CHINA NORMAL UNIVERSITY, Hubei (CN)

( * ) Notice: Subject to any disclaimer, the term of this patent is extended or adjusted under 35 U.S.C. 154(b) by 343 days.

(21) Appl. No.: 18/011,847

(22) PCT Filed: Sep. 7, 2021

(86) PCT No.: PCT/CN2021/116820
§ 371 (c)(1),
(2) Date: Dec. 21, 2022

(87) PCT Pub. No.: WO2023/019652
PCT Pub. Date: Feb. 23, 2023

(65) Prior Publication Data
US 2023/0334862 A1    Oct. 19, 2023

(30) Foreign Application Priority Data
Aug. 16, 2021   (CN) .......................... 202110939047.4

(51) Int. Cl.
| | | |
|---|---|---|
| *G06V 20/40* | (2022.01) | |
| *G06Q 50/20* | (2012.01) | |
| *G06V 10/774* | (2022.01) | |
| *G06V 40/20* | (2022.01) | |
| *G10L 25/57* | (2013.01) | |
| *G10L 25/78* | (2013.01) | |

(52) U.S. Cl.
CPC ........... *G06V 20/44* (2022.01); *G06Q 50/205* (2013.01); *G06V 10/774* (2022.01); *G06V 20/41* (2022.01);
(Continued)

(58) Field of Classification Search
CPC .... G06Q 50/205; G06V 10/774; G06V 20/41; G06V 20/44; G06V 20/49; G06V 40/20; G10L 25/57; G10L 25/78
See application file for complete search history.

(56) References Cited

U.S. PATENT DOCUMENTS 11,810,357 B2 *  11/2023  Reece ................... G06F 40/284
2020/0250608 A1    8/2020  Sharma et al.

FOREIGN PATENT DOCUMENTS

| CN | 111709358 | 9/2020 |
| CN | 112599135 | 4/2021 |

OTHER PUBLICATIONS

"International Search Report (Form PCT/ISA/210) of PCT/CN2021/116820," mailed on May 17, 2022, pp. 1-4.
(Continued)

*Primary Examiner* — Michael J Vanchy, Jr.
(74) *Attorney, Agent, or Firm* — JCIPRNET

(57) ABSTRACT

The present invention discloses construction method and system of a descriptive model of classroom teaching behavior events. The construction method includes steps as the followings: acquiring classroom teaching video data to be trained; dividing the classroom teaching video data to be trained into multiple events according to utterances of a teacher by using a voice activity detection technology; and performing multi-modal recognition on all events by using multiple artificial intelligence technologies to divide the events into sub-events in multiple dimensions, establishing an event descriptive model according to the sub-events, and
(Continued)

describing various teaching behavior events of the teacher in a classroom. The present invention divides a classroom video according to voice, which can ensure the completeness of the teacher's non-verbal behavior in each event to the greatest extent. Also, a descriptive model that uniformly describes all events is established by extracting commonality between different events, which can not only complete the description of various teaching behaviors of the teacher, but also reflect the correlation between events, so that the events are no longer isolated.

8 Claims, 4 Drawing Sheets

(52) U.S. Cl.
CPC .............. *G06V 20/49* (2022.01); *G06V 40/20* (2022.01); *G10L 25/57* (2013.01); *G10L 25/78* (2013.01)

(56) References Cited

OTHER PUBLICATIONS

"Written Opinion of the International Searching Authority (Form PCT/ISA/237) of PCT/ CN2021/116820," mailed on May 17, 2022, pp. 1-4.

\* cited by examiner

CONSTRUCTION METHOD AND SYSTEM OF DESCRIPTIVE MODEL OF CLASSROOM TEACHING BEHAVIOR EVENTS

CROSS-REFERENCE TO RELATED APPLICATION

This application is a 371 of international application of PCT application serial no. PCT/CN2021/116820, filed on Sep. 7, 2021, which claims the priority benefit of Chinese Patent Application No. 202110939047.4, filed on Aug. 16, 2021. The entirety of each of the above mentioned patent applications is hereby incorporated by reference herein and made a part of this specification.

TECHNICAL FIELD

The present invention relates to the technical field of education systems, and more specifically, to construction method and system of a descriptive model of classroom teaching behavior events.

RELATED ART

Classroom teaching behavior events mainly refer to events composed of a teacher's teaching behaviors in the classroom. By performing event division on the teacher's classroom teaching behaviors, the teacher's teaching behaviors can be better analyzed. Currently, the analysis and evaluation on a teacher's teaching behaviors is mainly performed according to the traditional manual method. However, manually dividing teaching behaviors in a classroom video to evaluate the teacher's classroom behaviors is greatly affected by subjective factors, which has a negative effect on the objective description of teaching events.

Although there are a few classroom video dividing systems available, most of them divide the classroom session directly according to a fixed time interval into different events with equal durations. However, with the duration of each event being prescribed, an utterance of the teacher may be split into two events, which will cause the teacher's teaching behavior to be fragmented in the same event and directly damages the completeness of the teacher's non-verbal behavior.

SUMMARY OF INVENTION

In view of the defects in the related art, an objective of the present invention is to provide construction method and system of a descriptive model of classroom teaching behavior events, intended to solve the problem of manually dividing teaching behaviors in a classroom video according to the traditional method to evaluate the teacher's classroom behaviors, which is greatly affected by subjective factors, and the problem of performing event division directly according to a fixed time interval as in the existing teaching event descriptive models, which causes the teacher's teaching behaviors to be split and makes it difficult to ensure the completeness of the teacher's behaviors.

To achieve the above objective, in a first aspect, the present invention provides a construction method of a descriptive model of classroom teaching behavior events, including steps below. Classroom teaching video data to be trained is acquired. The classroom teaching video data to be trained is divided into multiple events according to utterances of a teacher by using a voice activity detection technology. Multi-modal recognition is performed on all events by using multiple artificial intelligence technologies to divide the events into sub-events in multiple dimensions, an event descriptive model is established according to the sub-events, and various teaching behavior events of the teacher in a classroom are described.

In an embodiment, the construction method further includes the following step. Commonality between events is extracted, an event descriptive model that uniformly describes all events is established according to the commonality and the sub-events, and all teaching behavior events of the teacher that occur in the classroom are uniformly described.

In an embodiment, in the event descriptive model, an entire classroom teaching event sequence (E) is defined, $E=\{e_1, e_2, \ldots, e_n\}$, n indicates that n events occur, $e_i$ indicates an event, and $e_i$ is expressed by a 6-tuple <id, t, $d^t$, w, $a^w$, R>, where id is a unique identifier of an event;

t is a start time of the event;

$d^t$ is a duration corresponding to the event whose start time is t;

w is a dimension of the event, $w \in W$, $W=\{w_0, w_1, w_2, \ldots, w_m\}$, and the dimension includes the teacher's facial expression, speech emotion, gaze, hand gesture, and body posture;

$a^w$ is an attribute of an event w, $a^w \in \{a_1^w, a_2^w, \ldots, a_l^w\}$;

R indicates events correlated with a current event and correlations therebetween, and is a 2-tuple sequence defined as $R=\{<e_1, r_1>, <e_2, r_2>, \ldots, <e_n, r_n>\}$, where e in a relational 2-tuple <e, r> indicates an event associated with the current event, and r indicates a specific value of the correlation between the two events.

In an embodiment, the correlation between the two events includes a dimensional correlation and a temporal correlation.

In an embodiment, the dimensional correlation is determined by a fuzzy matrix $R=(r_{ij})_{m \times m}$, and the fuzzy matrix R is defined as:

$$R = \begin{bmatrix} r_{11} & r_{12} & r_{13} & \cdots & \cdots & r_{1m} \\ r_{21} & r_{22} & r_{23} & \cdots & \cdots & r_{2m} \\ & & \cdots & \cdots & & \\ r_{m1} & r_{m2} & r_{m3} & \cdots & \cdots & r_{mm} \end{bmatrix}$$

where $r_{ij} \in [0,1]$, $i=1,2,\ldots,m$, $j=1,2,\ldots,m$, $r_{ij}$ is a degree of correlation between an i-th dimension and a j-th dimension; if $r_{ij}=1$, then i=j and it indicates a degree of correlation between a same dimension, i.e., a highest correlation; if $r_{ij}=0$, it indicates that the i-th dimension and the j-th dimension are not correlated at all; and if $r_{ij} \in (0, 1)$, the closer to 1, the higher the correlation.

In an embodiment, when durations corresponding to two events are the same, the temporal correlation is calculated according to the Pearson coefficient, and when the durations corresponding to the two events are different, the temporal correlation is calculated by using dynamic time warping.

In a second aspect, the present invention provides a construction system of a descriptive model of classroom teaching behavior events, including a training data acquisition module, an event division module, and an event description module. The training data acquisition module is configured to acquire classroom teaching video data to be trained. The event division module is configured to divide the classroom teaching video data to be trained into multiple events according to utterances of a teacher by using a voice activity detection technology. The event description module is configured to perform multi-modal recognition on all events by using multiple artificial intelligence-related technologies to divide the events into sub-events in multiple dimensions, establish an event descriptive model according to the sub-events, and describe various teaching behavior events of the teacher in a classroom.

In a third aspect, the present invention provides a method for describing classroom teaching behavior events, including steps below. Target classroom teaching video data is acquired. The target classroom teaching video data is divided into multiple teaching events including various teaching behaviors of a teacher according to utterances of the teacher by using a voice activity detection technology. All teaching events are inputted to an event descriptive model constructed in advance by the above construction method to obtain description results of various teaching behavior events of the teacher in the classroom.

In a fourth aspect, the present invention provides a system for describing classroom teaching behavior events, including a target data acquisition module, a teaching event division module, and a processing module. The target data acquisition module is configured to acquire target classroom teaching video data. The teaching event division module is configured to divide the target classroom teaching video data into multiple teaching events including various teaching behaviors of a teacher according to utterances of the teacher by using a voice activity detection technology. The processing module is configured to input all teaching events to an event descriptive model constructed in advance by the above construction method to obtain description results of various teaching behavior events of the teacher in the classroom.

In a fifth aspect, the present invention provides a computer device including a memory and a processor. The memory stores a computer program, and when executing the computer program, the processor is configured to implement the above construction method or the above method for describing classroom teaching behavior events.

Overall, compared with the related art, the above technical solutions conceived in the present invention have the following advantageous effects.

(1) The construction method and system of a descriptive model of classroom teaching behavior events provided by the present invention break through the limitations of traditional manual evaluation and analysis of teacher behaviors, can realize multi-modal recognition on each event, and eliminate the influence of human factors.

(2) The construction method and system of a descriptive model of classroom teaching behavior events provided by the present invention divide the classroom video according to voice, which can ensure the completeness of the teacher's non-verbal behavior in each event to the greatest extent.

(3) The construction method and system of a descriptive model of classroom teaching behavior events provided by the present invention establish a descriptive model that uniformly describes all events by extracting commonality between different events, which can not only complete the description of various teaching behaviors of the teacher, but also reflect the correlation between events, so that the events are no longer isolated.

DESCRIPTION OF EMBODIMENTS

To make the objectives, technical solutions, and advantages of the present invention clearer, the present invention will be further described in detail below with reference to the accompanying drawings and embodiments. It should be understood that the specific embodiments described herein are only intended to explain the present invention, rather than limit the present invention.

The present invention provides a construction method of a descriptive model of classroom teaching behavior events to solve the problem of existing descriptive models of teaching events that events are directly divided according to fixed time intervals and as a result teaching behaviors of a teacher are split and it is difficult to ensure the completeness of the teacher's behaviors.

Figure 1:
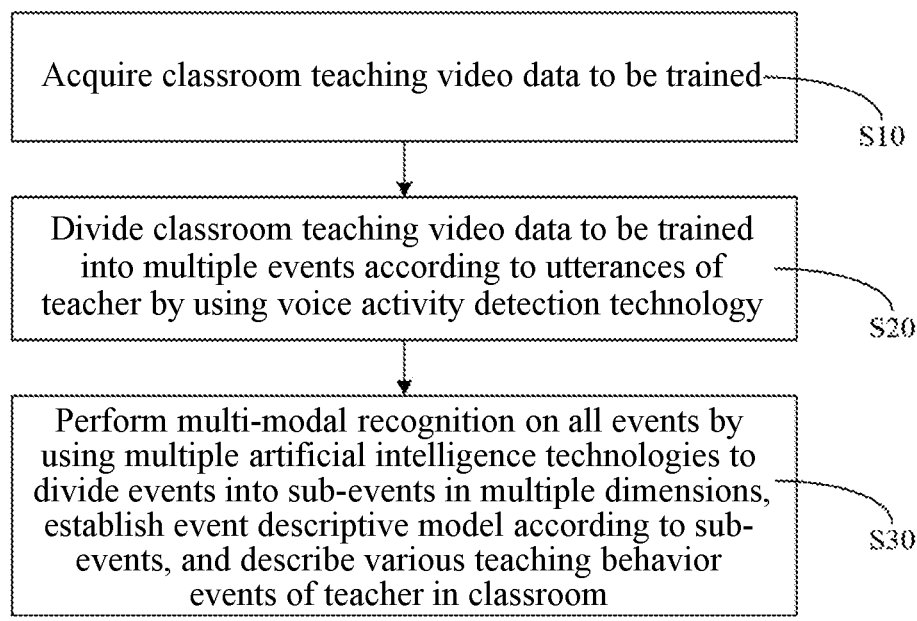
FIG. 1 and FIG. 2 are respectively a construction method flowchart and a technical flow chart of a descriptive model of classroom teaching behavior events in an embodiment.
Figure 2:
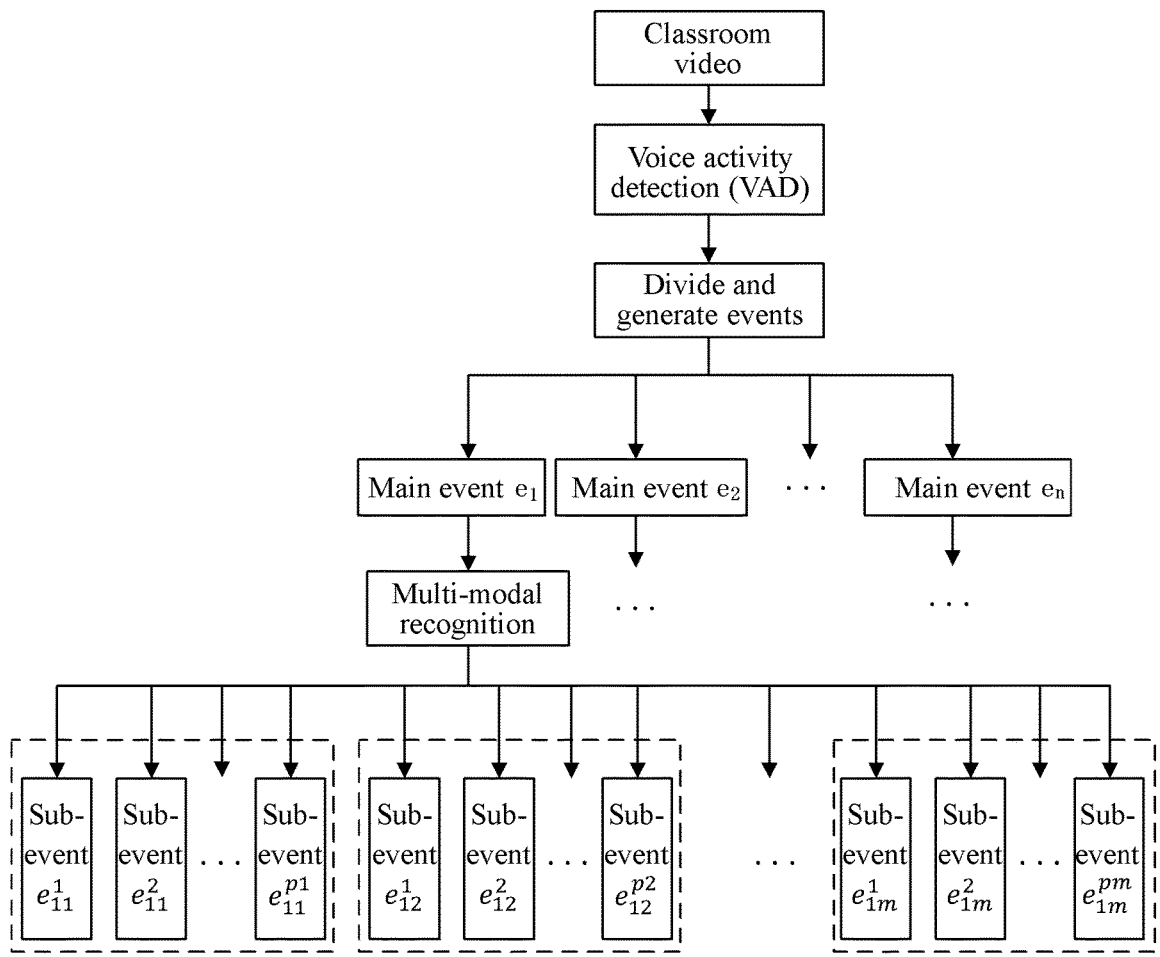

FIG. 1 and FIG. 2 are respectively a construction method flowchart and a technical flowchart of a model of classroom teaching behavior events provided by an embodiment of the present invention. As shown in FIG. 1 and FIG. 2, the construction method includes steps S10 to S30, as detailed below.

S10: acquire classroom teaching video data to be trained.

S20: divide the classroom teaching video data to be trained into multiple events according to utterances of a teacher by using a voice activity detection technology (VAD technology).

In step S20, the classroom video is divided into multiple events according to the teacher's utterances. Since the teacher's behaviors are generally accompanied by voice, dividing the classroom events according to voice can ensure to the greatest extent that the teacher's teaching behaviors will not be split.

S30, perform multi-modal recognition on all events by using multiple artificial intelligence technologies to divide the events into sub-events in multiple dimensions, establish an event descriptive model according to the sub-events, and describe various teaching behavior events of the teacher in a classroom.

In step S30, the multiple artificial intelligence technologies may be speech emotion recognition, head pose estimation, hand gesture recognition, etc. By performing multi-modal recognition on the events according to these technologies, the events can be correspondingly divided into sub-events in multiple dimensions such as speech emotion, head pose, hand gesture, etc., and then the status of the teacher's classroom is determined according to these sub-events. For example, according to sub-events in the speech emotion dimension, the classroom atmosphere of the whole session can be determined as positive, neutral, or negative. According to sub-events in the head pose dimension, it is possible to determine whether the teacher provides feedback behavior such as nodding, shaking his/her head, etc. to students. According to sub-events in the hand gesture dimension, it is possible to determine whether the teacher's hand gesture is a pointing gesture, a rhythmic gesture, or a symbolic gesture.

Figure 3:
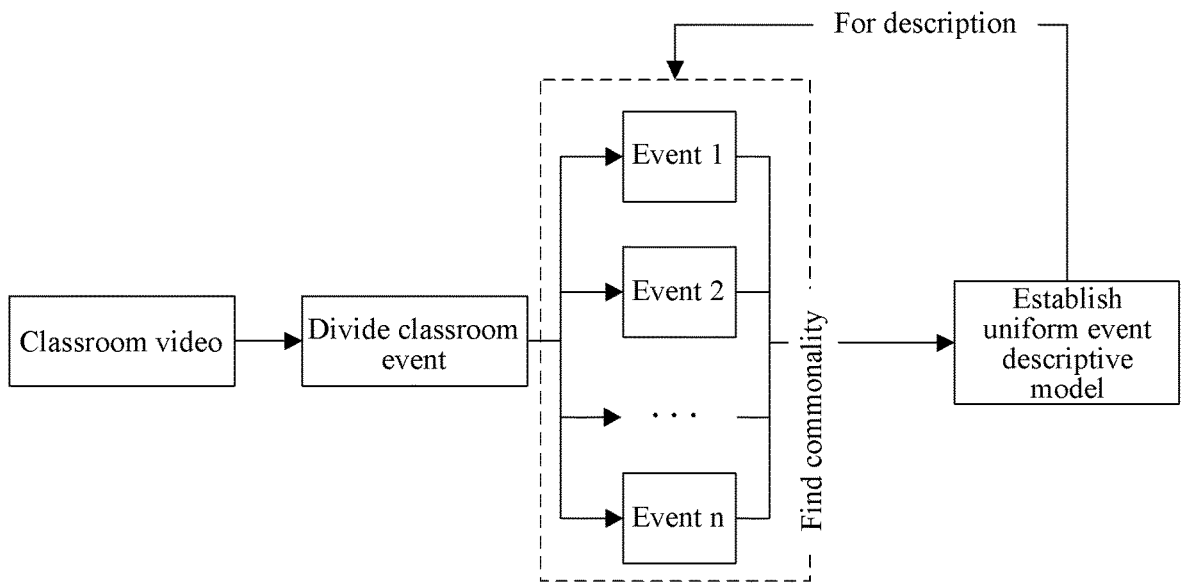
FIG. 3 is a technical flowchart of a construction method of a descriptive model of classroom teaching behavior events in another embodiment.

In an embodiment, referring to FIG. 3, step S30 may further include the following step.

Commonality between events is extracted, an event descriptive model that uniformly describes all events is established according to the commonality and the sub-events, and all teaching behavior events of the teacher that occur in the classroom are uniformly described.

It should be noted that currently no model is in place to uniformly describe a teacher's classroom teaching behaviors, but some scholars have studied teachers' teaching behaviors and used scales to describe teaching events. However, these scales generally have unification issues and cannot provide a uniform and intelligent description for all the events that occurred. As a result, all the events are scattered, the events are isolated points, and the correlation between them cannot be found.

In this embodiment, event division is performed on the classroom video in two steps. First, the classroom session is divided into multiple events according to the utterances of the teacher by using the voice activity detection (VAD) technology. Since the teacher's behaviors are generally accompanied by voice, dividing classroom events according to voice can ensure to the greatest extent that the teacher's teaching behaviors will not be split. Then, a descriptive model that can uniformly describe all events is found by extracting the commonality between different events, description of various teaching behaviors of the teacher is completed, and correlation between events is found, so that the events are no longer isolated.

In a specific embodiment, a technical solution to achieve the above objective includes the following.

(1) Divide Classroom Teaching Events

The first step in establishing a descriptive model is to perform event division on the classroom session, and the event division in the present invention may include two parts. The first step is to perform voice activity detection (VAD) on the classroom video to divide the classroom video into multiple events, and these events with voice as the main clue are referred to as main events. The second step is to perform multi-modal recognition on all main events. According to the different dimensions of recognition, each main event may be further divided into sub-events of several dimensions. For a main event, there will also be several sub-events corresponding to one dimension. Therefore, by performing event division, it is possible to eventually obtain several main events, sub-events in several dimensions corresponding to each main event, and several sub-events that occur in the same dimension within a time period of the same main event.

The event division divides the classroom video based on the VAD technology, realizes the division of the main events in the classroom, and provides event division points for other technologies. Then, using multiple artificial intelligence-related technologies, such as speech emotion recognition, head pose estimation, hand gesture recognition, etc., multi-modal recognition is performed on the main events to divide the main events into sub-events in multiple dimensions.

(2) Establish Descriptive Model of Classroom Teaching Events

An entire classroom teaching event sequence (E) is defined. $E=\{e_1, e_2, \ldots, e_n\}$, and n indicates that n events occur. $e_i$ is used to indicate a certain event, $i=1,2, \ldots, n$, and then $e_i$ may be expressed by a 6-tuple $<id, t, d^r, w, a^w, R>$.

where id is a unique identifier of the event.

t is a start time ($t \in Z$) of the event in milliseconds.

$d^r$ is a duration corresponding to the event whose start time is t.

w indicates an event dimension, i.e., a type, where $w \in W$, $W=\{w_0, w_1, w_2, \ldots, w_m\}$.

Specifically, $w_0$ indicates that the event is a teacher speech event, and the teacher speech event is defined as the main event. That is, when an event is $w=w_0$, it indicates that the event is the main event, while $w \in \{w_1, w_2, \ldots, w_m\}$, it indicates that the event is a sub-event.

The sub-event indicates a behavior of the teacher in the classroom that can be recognized using artificial intelligence-related technologies. There are many types, such as the teacher's facial expression, body posture, gaze, hand gesture, speech emotion, etc. Each type corresponds to a w.

$a^w$ is an attribute of the event w, and $a^w \in \{a_1^w, a_2^w, \ldots, a_l^w\}$. Each event type w has a corresponding $a^w$ attribute set. For example, when $w=w_0$, the corresponding attribute set is $a^{w_0} \in \{$teacher speech, student speech, silence, mixed speech$\}$.

Assuming that when $w=w_1$, the event type is a teacher gaze event, then the corresponding attribute set is $a^{w_1} \in \{$looking to student, looking to blackboard/screen, looking to teaching material visible only to himself/herself$\}$.

Thus, the attribute sets of all event types form an irregular matrix:

$$\begin{bmatrix} a_1^{w_1} & a_2^{w_1} & \cdots & a_l^{w_1} \\ a_1^{w_2} & a_2^{w_2} & \cdots & a_l^{w_2} \\ & & \cdots & \\ a_1^{w_m} & a_2^{w_m} & \cdots & a_l^{w_m} \end{bmatrix}.$$

R indicates events correlated with the current event and the correlations therebetween and is a 2-tuple sequence $R=\{<e_1, r_1>, <e_2, r_2>, \ldots, <e_n, r_n>\}$, where e in the relational 2-tuple $<e, r>$ indicates an event associated with the current event, and r indicates a specific value of correlation between the two events.

Assuming that the classroom teaching event sequence is $E=[e_1, e_2, \ldots, e_n]$, where $n>0$ and $n \in Z$, and multi-modal recognition is performed on the event to divide the event into $e_{ij}$($1 \le i \le n$, $1 \le j \le m$), where n indicates n main events and m indicates m modalities, then the sub-events accompanying the main events may be expressed as:

$$e_1 = [e_{11}, e_{12}, \ldots, e_{1m}]$$

$$e_2 = [e_{21}, e_{22}, \ldots, e_{2m}]$$

$$\ldots$$

$$e_n = [e_{n1}, e_{n2}, \ldots, e_{nm}].$$

However, there may be more than one sub-event of the same type corresponding to the same main event. For example, in a teacher speech event, the teacher's gaze may not only be directed to the students, but also to the teaching material visible only to himself/herself. Accordingly, there are two sub-events of the teacher gaze type corresponding to this main event. Then, $$e1 = \begin{bmatrix} e_{11}^1 & e_{11}^2 & \cdots \\ e_{12}^1 & e_{12}^2 & \cdots \\ & \cdots & \\ e_{1m}^1 & e_{1m}^2 & \cdots \end{bmatrix}$$

$$e2 = \begin{bmatrix} e_{21}^1 & e_{21}^2 & \cdots \\ e_{22}^1 & e_{22}^2 & \cdots \\ & \cdots & \\ e_{2m}^1 & e_{2m}^2 & \cdots \end{bmatrix}$$

$$\cdots$$

$$en = \begin{bmatrix} e_{n1}^1 & e_{n1}^2 & \cdots \\ e_{n2}^1 & e_{n2}^2 & \cdots \\ & \cdots & \\ e_{nm}^1 & e_{nm}^2 & \cdots \end{bmatrix}.$$

For the sub-event matrix corresponding to each main event, a row in the matrix represents sub-events of one type, and all events in each type of sub-events, i.e., all time elements in a row, are sequentially ordered in time. Sub-events of different types, i.e., each of the rows in the sub-event matrix, temporally correspond to the time segment of occurrence of the main event and have the same start time and end time. That is, the matrix is temporally a parallel time series matrix.

Then, $$e = [e_1, e_2, \ldots, e_n] =$$

$$\begin{bmatrix} \begin{bmatrix} e_{11}^1 & e_{11}^2 & \cdots \\ e_{12}^1 & e_{12}^2 & \cdots \\ & \cdots & \\ e_{1m}^1 & e_{1m}^2 & \cdots \end{bmatrix}, \begin{bmatrix} e_{21}^1 & e_{21}^2 & \cdots \\ e_{22}^1 & e_{22}^2 & \cdots \\ & \cdots & \\ e_{2m}^1 & e_{2m}^2 & \cdots \end{bmatrix}, \ldots, \begin{bmatrix} e_{n1}^1 & e_{n1}^2 & \cdots \\ e_{n2}^1 & e_{n2}^2 & \cdots \\ & \cdots & \\ e_{nm}^1 & e_{nm}^2 & \cdots \end{bmatrix} \end{bmatrix}$$

(3) Correlation Between Events

There is a certain correlation between the divided events. For example, when a teacher smiles, his/her speech emotion is generally more positive. When the teacher's gaze is directed to the students, his/her hand gesture is more likely to be a pointing hand gesture. Taking an event with the facial expression being a smile as an example, it has a stronger correlation with an event that belongs to the same main event and has speech emotion being positive. That is, there will be dimensional and temporal correlations between the two events, and the strength of correlation between dimensions differs.

It is not difficult to see from the above examples that there is also a temporal correlation between events. For example, the correlation between events that occur at the same time is stronger than that between events that occur at a great time difference.

In summary of the above, the correlation between two events may be indicated by the dimensional correlation and the temporal correlation.

(a) Dimensional Correlation

A dimension set $A=\{d_i | 0 \leq i \leq m$ and $i \in Z\}$ is defined. Let the domain of discourse be A itself, then a product space $A \times A = \{(d_i, d_j) | d_i \in A, d_j \in A, 0 \leq i \leq m, 0 \leq j \leq m$ and $i, j \in Z\}$. R is a fuzzy relationship from A to A, and its membership function is $\mu_R(d, d)$. If there is $\mu_R(d, d) = r_{ij} \in [0,1]$ for any $(d_i, d_j) \in A \times A$, then record a fuzzy matrix $R = (r_{ij})_{m \times m}$ between different dimensions, that is, $$R = \begin{bmatrix} r_{11} & r_{12} & r_{13} & \cdots & \cdots & r_{1m} \\ r_{21} & r_{22} & r_{23} & \cdots & \cdots & r_{2m} \\ & & \cdots & \cdots & & \\ r_{m1} & r_{m2} & r_{m3} & \cdots & \cdots & r_{mm} \end{bmatrix}$$

where $r_{ij} \in [0,1]$, $i=1,2,\ldots,m$, $j=1,2,\ldots,m$, $r_{ij}$ is a degree of correlation between the i-th dimension and the j-th dimension. If $r_{ij}=1$, then i=j, and it indicates the degree of correlation between the same dimension, i.e., the highest correlation. If $r_{ij}=0$, it indicates that the i-th dimension and the j-th dimension are not correlated at all. If $r_{ij} \in (0, 1)$, the closer to 1, the higher the correlation.

(b) Temporal Correlation

Different events have different event sequence representations. Assume that the time sequences corresponding to an event A and an event B are respectively X and Y, and their durations are respectively $t_1$ and $t_2$.

If $t_1 = t_2$, a similarity between two time sequences may be calculated directly using the Pearson coefficient:

$$COR(X, Y) = \frac{\sum_{t=1}^{t_1}(x_t - \bar{X}) \cdot (y_t - \bar{Y})}{\sqrt{\sum_{t=1}^{t_1}(x_t - \bar{X})^2} \cdot \sqrt{\sum_{t=1}^{t_1}(y_t - \bar{Y})^2}}$$

where $x_t$ indicates a corresponding value of the time sequence X at time t, $y_t$ indicates a corresponding value of the time sequence Y at time t, and T indicates a total duration of the time sequences of the two events.

$$\bar{X} = \sum_{t=1}^{t_1} x_t / T, \quad \bar{Y} = \sum_{t=1}^{t_2} y_t / T$$

If $t_1 \neq t_2$, the similarity is calculated by using dynamic time warping (DTW).

First, the two sequences are aligned such that the distance between the two sequences is minimized. A $t_1 \times t_2$ matrix is constructed, where a matrix element (i, j) represents the distance between $x_i$ and $y_j$. Here, a Euclidean distance is generally calculated. Then, (i, j) also represents the alignment between point $x_i$ and point $y_j$. Then, according to the dynamic programming algorithm, a path P passing through points of this grid is found. A kth element of P is $p_k = (i,j)_k$, which defines the mapping of sequences X and Y $P = p_1, p_2, \ldots, p_k, \ldots, p_K$ max $(t_1, t_2) \leq K \leq t_1 + t_2 + 1$
then $DTW(X,Y) = \min\{\sqrt{\sum_{k=1}^{K} p_k}/K\}$.

Then, for two classroom events $e_{ij}^k$ and $e_{i'j'}^{k'}$, let the dimensional correlation be $r_d$ $r_d = R[e_{ij}^k \text{->dimension}, e_{i'j'}^{k'} \text{->dimension}]$ Let the temporal correlation be $r_t$:

$$r_t = \begin{cases} COR(X, Y) & \text{if}(t_1 = t_2) \\ DTW(X, Y) & \text{if}(t_1 \neq t_2) \end{cases}.$$

After normalizing the temporal correlation and obtaining a weighted sum with the dimensional correlation, the correlation between the two events may be obtained.

Then, the correlation between the two events may be collectively represented by the dimensional correlation and the temporal correlation.

$r=w_1*r_d+w_2*r_t$, where $w_1$ and $w_2$ indicate the weights of the two correlations.

In the construction method of a model of classroom teaching behavior events provided by the present invention, event division is performed on the classroom video in two steps by using artificial intelligence-related technologies, to thereby divide the classroom session into multiple teaching events including various teaching behaviors of the teacher.

(1) A descriptive model of teaching events is proposed to uniformly describe teaching behaviors of the teacher in the classroom in a teaching-intelligent manner.

(2) The event mode model proposed by the present invention can not only describe the attribute teachings of teaching events, but the model can also express the correlation between events.

Figure 4:
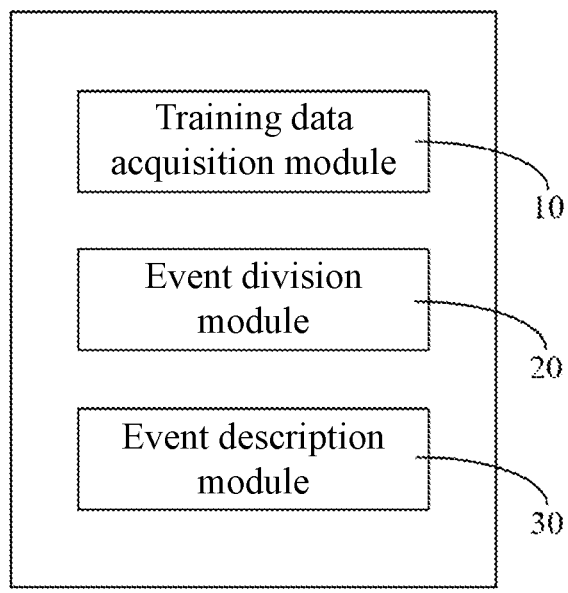
FIG. 4 is a structural view of a construction system of a descriptive model of classroom teaching behavior events in an embodiment.

Based on the same inventive concept, the present invention further provides a construction system of a descriptive model of classroom teaching behavior events, as shown in FIG. 4. The system includes a training data acquisition module 10, an event division module 20, and an event description module 30.

The training data acquisition module 10 is configured to acquire classroom teaching video data to be trained.

The event division module 20 is configured to divide the classroom teaching video data to be trained into multiple events according to utterances of a teacher by using a voice activity detection technology.

The event description module 30 is configured to perform multi-modal recognition on all events by using multiple artificial intelligence-related technologies to divide the events into sub-events in multiple dimensions, establish an event descriptive model according to the sub-events, and describe various teaching behavior events of the teacher in a classroom.

Specifically, reference may be made to the detailed descriptions in the above embodiment of the construction method for the functions of each module in FIG. 4, which shall not be repeated herein.

Figure 5:
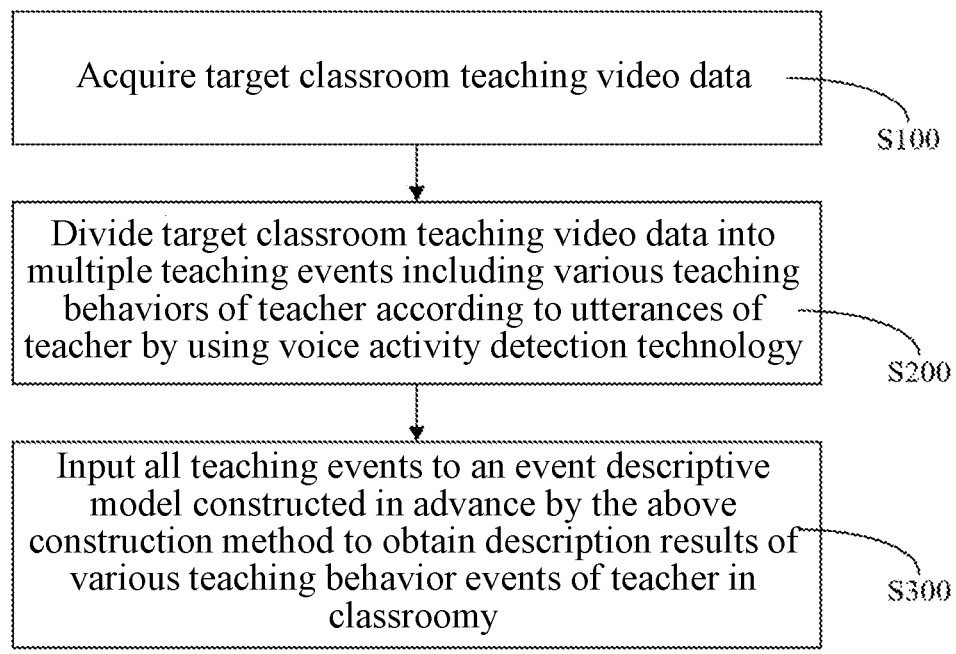
FIG. 5 is a flowchart of a method for describing classroom teaching behavior events in an embodiment.

Referring to FIG. 5, the present invention further provides a method for describing classroom teaching behavior events, including steps S100 to S300, as detailed below.

S100, acquire target classroom teaching video data.

S200, divide the target classroom teaching video data into multiple teaching events including various teaching behaviors of a teacher according to utterances of the teacher by using a voice activity detection technology.

S300, input all teaching events to an event descriptive model constructed in advance by the above construction method to obtain description results of various teaching behavior events of the teacher in a classroom.

The method for describing classroom teaching behavior events provided by the present invention is based on the event descriptive model constructed by the above construction method, and can not only describe various teaching behavior events of the teacher in the target classroom teaching video, but also express the correlation between events.

Figure 6:
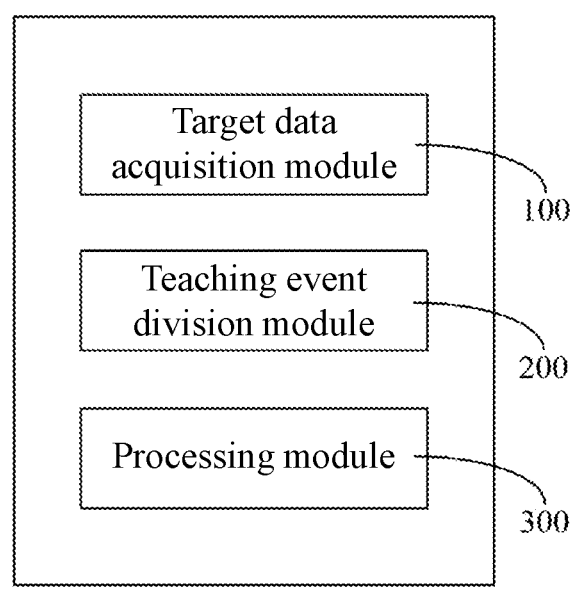
FIG. 6 is a structural view of a system for describing classroom teaching behavior events in an embodiment.

Referring to FIG. 6, the present invention provides a system for describing classroom teaching behavior events.

The system includes a target data acquisition module 100, a teaching event division module 200, and a processing module 300.

The target data acquisition module 100 is configured to acquire target classroom teaching video data.

The teaching event division module 200 is configured to divide the target classroom teaching video data into multiple teaching events including various teaching behaviors of a teacher according to utterances of the teacher by using a voice activity detection technology.

The processing module 300 is configured to input all teaching events to an event descriptive model constructed in advance by the above construction method to obtain description results of various teaching behavior events of the teacher in a classroom.

Specifically, reference may be made to the detailed descriptions in the above embodiment of the method for describing classroom teaching behavior events for the functions of each module in FIG. 6, which shall not be repeated herein.

The present invention further provides a computer device including a memory and a processor. The memory stores a computer program. When executing the computer program, the processor is configured to implement the above construction method or the above method for describing classroom teaching behavior events.

Those skilled in the art can easily understand that the above descriptions are only exemplary embodiments of the present invention and are not intended to limit the present invention. Any modifications, equivalent replacements, and improvements made within the spirit and principles of the present invention should all be included within the protection scope of the present invention.

What is claimed is:

1. A construction method of a descriptive model of classroom teaching behavior events, comprising steps as the followings:
    (1) acquiring classroom teaching video data to be trained;
    (2) dividing the classroom teaching video data to be trained into multiple events according to utterances of a teacher by using a voice activity detection technology; and
    (3) performing multi-modal recognition on all events by using multiple artificial intelligence technologies to divide the events into sub-events in multiple dimensions, establishing an event descriptive model according to the sub-events, and describing various teaching behavior events of the teacher in a classroom;
    wherein step (3) further comprises:
    extracting commonality between events, establishing an event descriptive model that uniformly describes all events according to the commonality and the sub-events, and uniformly describing all teaching behavior events of the teacher that occur in the classroom;
    wherein in the event descriptive model, an entire classroom teaching event sequence (E) is defined, $E=\{e_1, e_2, \ldots, e_n\}$, n indicates that n events occur, $e_i$ indicates an event, and $e_i$ is expressed by a 6-tuple <id, t, dt, w, $a^w$, R>, wherein id is a unique identifier of an event;
    t is a start time of the event;
    dt is a duration corresponding to the event whose start time is t;
    w is a dimension of the event, $w \in W$, $W=\{w_0, w_1, w_2, \ldots, w_m\}$, and the dimension comprises the teacher's facial expression, speech emotion, gaze, hand gesture, and body posture;

$a^w$ is an attribute of an event w, $a^w \in \{a_1^w, a_2^w, \ldots, a_l^w\}$ R indicates events correlated with a current event and correlations therebetween, and is a 2-tuple sequence defined as R=$\{<e_1, r_1>, <e_2, r_2>, \ldots, <e_n, r_n>\}$, where e in a relational 2-tuple <e, r> indicates an event associated with the current event, and r indicates a specific value of the correlation between the two events.

2. The construction method of a descriptive model of classroom teaching behavior events according to claim 1, wherein the correlation between the two events comprises a dimensional correlation and a temporal correlation.

3. The construction method of a descriptive model of classroom teaching behavior events according to claim 2, wherein the dimensional correlation is determined by a fuzzy matrix R=$(r_{ij})_{m \times m}$, and the fuzzy matrix R is defined as:

$$R = \begin{bmatrix} r_{11} & r_{12} & r_{13} & \cdots & \cdots & r_{1m} \\ r_{21} & r_{22} & r_{23} & \cdots & \cdots & r_{2m} \\ & & \cdots & \cdots & & \\ r_{m1} & r_{m2} & r_{m3} & \cdots & \cdots & r_{mm} \end{bmatrix}$$

where $r_{ij} \in [0,1]$, i=1,2,...,m, j=1,2,...,m, $r_{ij}$ is a degree of correlation between an i-th dimension and a j-th dimension; if $r_{ij}$=1, then i=j and it indicates a degree of correlation between a same dimension, i.e., a highest correlation; if $r_{ij}$=0, it indicates that the i-th dimension and the j-th dimension are not correlated at all; and if $r_{ij} \in (0, 1)$, the closer to 1, the higher the correlation.

4. The construction method of a descriptive model of classroom teaching behavior events according to claim 2, wherein when durations corresponding to two events are the same, the temporal correlation is calculated according to the Pearson coefficient, and when the durations corresponding to the two events are different, the temporal correlation is calculated by using dynamic time warping.

5. A method for describing classroom teaching behavior events, comprising steps as the followings:
   acquiring target classroom teaching video data;
   dividing the target classroom teaching video data into multiple teaching events including various teaching behaviors of a teacher according to utterances of the teacher by using a voice activity detection technology; and
   inputting all teaching events to an event descriptive model constructed in advance by the construction method according to claim 1 to obtain description results of various teaching behavior events of the teacher in the classroom.

6. A system for describing classroom teaching behavior events, comprising:
   a target data acquisition module configured to acquire target classroom teaching video data;
   a teaching event division module configured to divide the target classroom teaching video data into multiple teaching events including various teaching behaviors of a teacher according to utterances of the teacher by using a voice activity detection technology; and
   a processing module configured to input all teaching events to an event descriptive model constructed in advance by the construction method according to claim 1 to obtain description results of various teaching behavior events of the teacher in the classroom.

7. A computer device comprising a memory and a processor, the memory stores a computer program, and when executing the computer program, the processor is configured to implement the construction method according to claim 1.

8. A construction system of a descriptive model of classroom teaching behavior events, comprising:
   a training data acquisition module configured to acquire classroom teaching video data to be trained;
   an event division module configured to divide the classroom teaching video data to be trained into multiple events according to utterances of a teacher by using a voice activity detection technology; and
   an event description module configured to perform multimodal recognition on all events by using multiple artificial intelligence-related technologies to divide the events into sub-events in multiple dimensions, establish an event descriptive model according to the sub-events, and describe various teaching behavior events of the teacher in a classroom;
   wherein the event description module is further configured to extract commonality between events, establishing an event descriptive model that uniformly describes all events according to the commonality and the sub-events, and uniformly describing all teaching behavior events of the teacher that occur in the classroom;
   wherein in the event descriptive model, an entire classroom teaching event sequence (E) is defined, E=$\{e_1, e_2, \ldots, e_n\}$, n indicates that n events occur, $e_i$ indicates an event, and $e_i$ is expressed by a 6-tuple <id, t, dt, w, $a^w$, R>, wherein
   id is a unique identifier of an event;
   t is a start time of the event;
   $d^t$ is a duration corresponding to the event whose start time is t;
   w is a dimension of the event, w∈W, W=$\{w_0, w_1, w_2, \ldots, w_m\}$, and the dimension comprises the teacher's facial expression, speech emotion, gaze, hand gesture, and body posture;
   $a^w$ is an attribute of an event w, $a^w \in \{a_1^w, a_2^w, \ldots, a_l^w\}$
   R indicates events correlated with a current event and correlations therebetween, and is a 2-tuple sequence defined as R=$\{<e_1, r_1>, <e_2, r_2>, \ldots, <e_n, r_n>\}$, where e in a relational 2-tuple <e, r > indicates an event associated with the current event, and r indicates a specific value of the correlation between the two events.

* * * * *